United States Patent

Hayashi et al.

[11] Patent Number: 5,679,303
[45] Date of Patent: Oct. 21, 1997

[54] METHOD OF AND AN APPARATUS FOR FORMING WEATHER STRIP BY EXTRUSION

[75] Inventors: Keizo Hayashi, Nagoya; Hiroyasu Kozawa, Ichinomiya, both of Japan

[73] Assignee: Toyoda Gosei Co., Ltd., Aichi, Japan

[21] Appl. No.: 531,979

[22] Filed: Sep. 21, 1995

[30] Foreign Application Priority Data

Sep. 22, 1994 [JP] Japan .................. 6-228419

[51] Int. Cl.$^6$ .................. B29C 47/06; B29C 47/12
[52] U.S. Cl. .................. 264/167; 264/172.1; 264/173.17; 264/177.17; 264/177.18; 425/131.1; 425/462; 425/465; 425/466
[58] Field of Search .................. 264/167, 177.17, 264/177.18, 173.17, 172.1, 40.7; 425/131.1, 465, 466, 462

[56] References Cited

U.S. PATENT DOCUMENTS

| | | | |
|---|---|---|---|
| 4,584,150 | 4/1986 | Ballocca | 264/167 |
| 4,765,936 | 8/1988 | Ballocca | 264/167 |
| 4,851,067 | 7/1989 | Ogawa et al. | 156/244.18 |
| 4,861,530 | 8/1989 | Zaccaria | 264/172.1 |
| 4,960,375 | 10/1990 | Saito et al. | 264/173.17 |
| 5,099,612 | 3/1992 | Hayashi et al. | |
| 5,190,338 | 3/1993 | Yada | 264/40.7 |
| 5,240,664 | 8/1993 | Hayashi et al. | 264/177.17 |
| 5,447,670 | 9/1995 | Ito et al. | 264/40.7 |
| 5,468,438 | 11/1995 | Yada | 264/170.17 |
| 5,474,817 | 12/1995 | Yada et al. | 264/167 |

FOREIGN PATENT DOCUMENTS

| | | | |
|---|---|---|---|
| 62-121030 | 6/1987 | Japan . | |
| 4-303617 | 10/1992 | Japan | 264/167 |
| 5-154890 | 6/1993 | Japan | 264/167 |

*Primary Examiner*—Jeffery R. Thurlow
*Attorney, Agent, or Firm*—Cushman Darby & Cushman IP Group of Pillsbury Madison & Sutro LLP

[57] ABSTRACT

An apparatus for extruding a weather strip having first and second function portions and a connecting portion interconnecting these function portions is disclosed. The connecting portion varies in width according to a longitudinal position along the weather strip. Included in the apparatus is a head, a main die plate which is mated with a front side of the head and which has a first opening for extruding rubber therethrough to form a first function portion, such as a mounting portion, and part of the connecting portion, a fixed die plate connected to the main die plate, and a movable die disposed in the fixed die plate. The movable die has a second opening for extruding rubber therethrough to form a second function portion, such as a sealing portion, and part of the connecting portion and is slidably received in a reception portion in the fixed die plate. A discharge rate of the rubber for forming the connecting portion is adjustable in accordance with the sliding movement of the movable die. Burrs on the resulting weather strip are therefore avoided. Also, sacrificial portions of the rubber are not generated. The second opening in the movable die is formed into a required special configuration, and by moving the movable die, the width of the connecting portion can be easily varied while maintaining the shape of the seal portion.

22 Claims, 8 Drawing Sheets

METHOD OF AND AN APPARATUS FOR FORMING WEATHER STRIP BY EXTRUSION

BACKGROUND OF THE INVENTION

This invention relates to a method of and an apparatus for forming an extruded weather strip having a first function portion, a second function portion, and a connecting portion interconnecting the first and second function portions which varies in width according to a longitudinal position along the weather strip.

DESCRIPTION OF RELATED ART

Weather strips have heretofore been mounted on a peripheral edge of an opening in an automobile body (vehicle body) to form a seal between the peripheral edge of the opening and a mating member, such as a door. As shown in FIG. 12, weather strip 51 is formed by known extrusion processes in an elongate form and has a cross-sectional shape as shown. More Specifically, the weather strip 51 comprises a trim portion 52 with a generally U-shaped cross-section adapted to be secured to the vehicle body. A lip 53 extends from the trim portion 52 toward the outside of the vehicle body (right-hand direction in FIG. 12) to cover a joint portion of the vehicle body, thereby improving the appearance of the automobile. The lip 53 has at its outer end a thickened portion 53a which faces the inside of the vehicle body (downwardly as viewed in FIG. 12). When the weather strip 51 is mounted on the vehicle body, the thickened portion 53a of the lip 53 contacts the vehicle body.

The configuration of the vehicle body where the weather strip is to be mounted varies according to position. Therefore, recently, a need has arisen for a weather strip which has a variable width W1 of the lip 53 according to its position with respect to the body.

One technique to meet this need is disclosed in, for example, U.S. Pat. No. 4,584,150. In this technique, unvulcanized rubber is extruded from an extrusion orifice. To reduce the width W1 of the lip portion 53 as described above, a shutter is moved to close off part of the extrusion orifice. By partly closing the extrusion orifice, the width W1 of the longitudinal position of the lip 53 can be reduced. In the above technique, it is also possible to reduce the formation of sacrificial or scrap portions of unvulcanized rubber in contrast to another method in which the width of the lip 53 is varied by cutting the lip portion 53 using a cutter.

In the above conventional technique, the shutter provided at the front side of the extrusion orifice usually comprises a fixed orifice plate and a movable orifice plate which functions as a shutter. The movable orifice plate has a predetermined shape and slides relative to the fixed orifice plate. By this movement, the width W1 of the lip 53 can be changed.

In this case, however, it is possible for unvulcanized rubber to intrude into the boundary between the movable orifice plate and the fixed orifice plate. If this occurs, a burr 54 made of unvulcanized rubber is formed on the edge of the lip 53 as shown in FIG. 13, so that the lip 53 may fail to fully perform its sealing function. In addition, if the burr 54 is formed on the design surface side, as shown in FIG. 13, then when the weather strip is mounted on the vehicle body, its aesthetic appearance is remarkably deteriorated.

Occasionally, it is desirable to extrude a weather strip 61 with a special shape, for example, including a seal portion 62 with a hollow portion 62a, as shown in FIG. 14. In this weather strip 61, for example, the seal portion 62 is connected to a trim portion 63 through a connecting portion 64. In this construction, it is essentially impossible to change the width W2 of the connecting portion 64 while maintaining the configuration of the hollow portion 62a, using the above-mentioned technique with a movable shutter.

SUMMARY OF THE INVENTION

With the above problems in mind, it is an object of this invention to provide a method for extruding a weather strip having a first function portion, a second function portion, and a connecting portion interconnecting the first and second function portions. According to the present invention, the width of the connecting portion can be varied according to a longitudinal location therealong while not only maintaining the intended sealing functions of the function portions but while also achieving an improved aesthetic appearance of the resulting weather strip. Even if the function portions have a special, relatively complicated shape, the width of the connecting portion can be easily varied.

Another object of the invention is to provide an apparatus for producing such a weather strip.

According to a first aspect of the present invention, a method is provided for forming, by extrusion, a weather strip comprising a first function portion, a second function portion, and a connecting portion interconnecting the first and second function portions. A width of the connecting portion can be varied according to a longitudinal position along the length of the weather strip. The method comprises the steps of:

extruding an unvulcanized rubber forwardly from an extruding head;

forming the first function portion and a part of the connecting portion by extruding the unvulcanized rubber through an extrusion opening formed in a main die plate provided on a front side of the head;

forming the second function portion by extruding the unvulcanized rubber through another or second extrusion opening formed in a movable die slidably received in a reception portion of a fixed die plate provided on the opposite side of the main die plate from the head, and connecting the second function portion to the connecting portion, the movable die being slidably movable within the reception portion generally in a direction along the width of the connecting portion to be formed; and varying the width of the connecting portion by moving the movable die while the unvulcanized rubber is being extruded.

In the above method, preferably, the step of forming the second function portion include supplying the unvulcanized rubber from at least one pair of supply passages disposed on opposite sides of the movable die and the second extrusion opening in a direction generally perpendicular to the direction of the length of the weather strip being formed.

According to a second aspect of the invention, an apparatus is provided for forming, by extrusion, a weather strip comprising a first function portion, a second function portion, and a connecting portion interconnecting the first and second function portions. The connecting portion has a width that can be varied according to a longitudinal position along the connecting portion.

The apparatus comprises:

an extruder device for forwardly extruding unvulcanized rubber from a head;

a main die plate provided on a front side of the head, the main die plate having a first opening through which the unvulcanized rubber is extruded to form the first function portion and a part of the connecting portion;

a fixed die plate provided on a front side of the main die plate opposite from the head, the fixed die plate having an open reception portion formed through a generally central portion thereof; and a movable die slidably received in the reception portion adapted to slide along a direction parallel to the width of the connecting portion of the weather strip, the movable die having a second opening through which the unvulcanized rubber is extruded to form the second function portion and part of the connecting portion.

In the above apparatus, preferably at least one pair of unvulcanized rubber supply passages are provided on opposing sides of the second opening of the movable die, along a direction generally perpendicular to a length direction of the weather strip.

In the above apparatus, the movable die preferably operates to connect the formed second function portion to said connecting portion of the weather strip.

In the present invention, the unvulcanized rubber is extruded forwardly the head by an extruder device. The first function portion and at least part of the connecting portion of the weather strip are formed by the first opening in the main die plate provided on the front side of the head. The second function portion is formed by the second opening in the movable die received in the reception portion of the fixed die plate, which is provided on the front side of the main die plate. Also, the second function portion is connected to the connecting portion. The movable die is slidingly moved so as to vary the width of the connecting portion. With this width change, a weather strip is thereby obtained in which the connecting portion varies in width according to a longitudinal position therealong.

In the present invention, the width of the connecting portion is changed by moving the movable die in the direction along the width of the connecting portion. Therefore, in contrast with the conventional technique in which unvulcanized rubber may intrude into a boundary between the shutter and the fixed orifice plate, any burrs will not be formed on the outer side edge of the weather strip.

When extruding a weather strip having a uniquely shaped function portion (such as, for example, a hollow portion), the second opening in the movable die is formed into such a special configuration, and by moving the movable die, the width of the connecting portion can be easily varied while maintaining such a configuration.

When the second function portion is to be formed, the unvulcanized rubber is supplied to the movable die from at least one pair of supply passages formed in the fixed die plate which open into opposite sides of the open reception portion in which the movable die is disposed, in a direction generally perpendicular to the length direction of the weather strip. The movable die, in turn, has corresponding openings located on opposite sides thereof which communicate with the at least one pair of oppositely facing supply passages formed in the fixed die plate. According to this arrangement, applied forces caused by the respective unvulcanized rubber materials being supplied from the pair of supply passages are evenly applied to the movable die. Accordingly, these stresses substantially offset each other since the supply passages are disposed in opposed relation to each other. Therefore, the resistance to the sliding movement of the movable die in the reception portion is small, so that the movable die can be easily and assuredly operated or moved.

The formed second function portion is positively connected to the connecting portion by the connecting portion forming structure device provided in the movable die.

DESCRIPTION OF THE PREFERRED EMBODIMENTS

A preferred embodiment of the present invention will now be described with reference to FIGS. 1 to 11.

Figure 2:
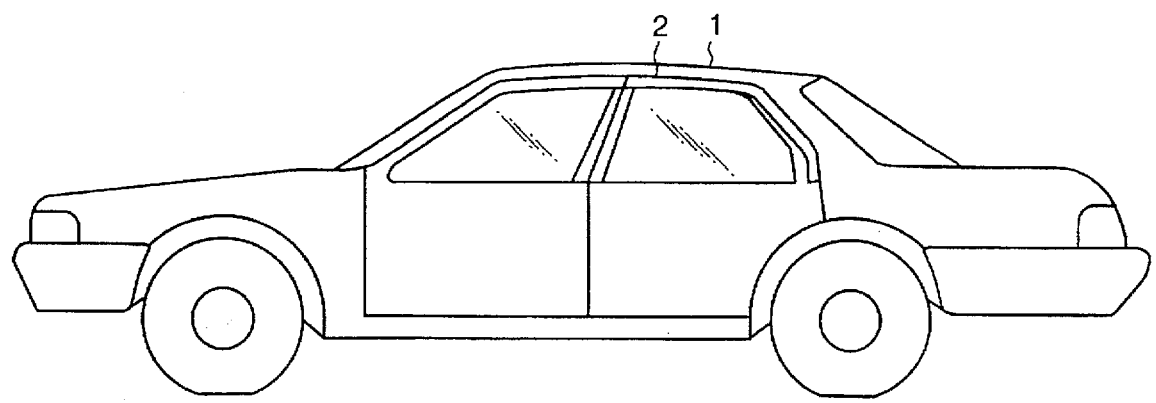
FIG. 2 is a side-elevational view of a vehicle body, generally showing a portion thereof on which the weather strip is mounted.
Figure 3:
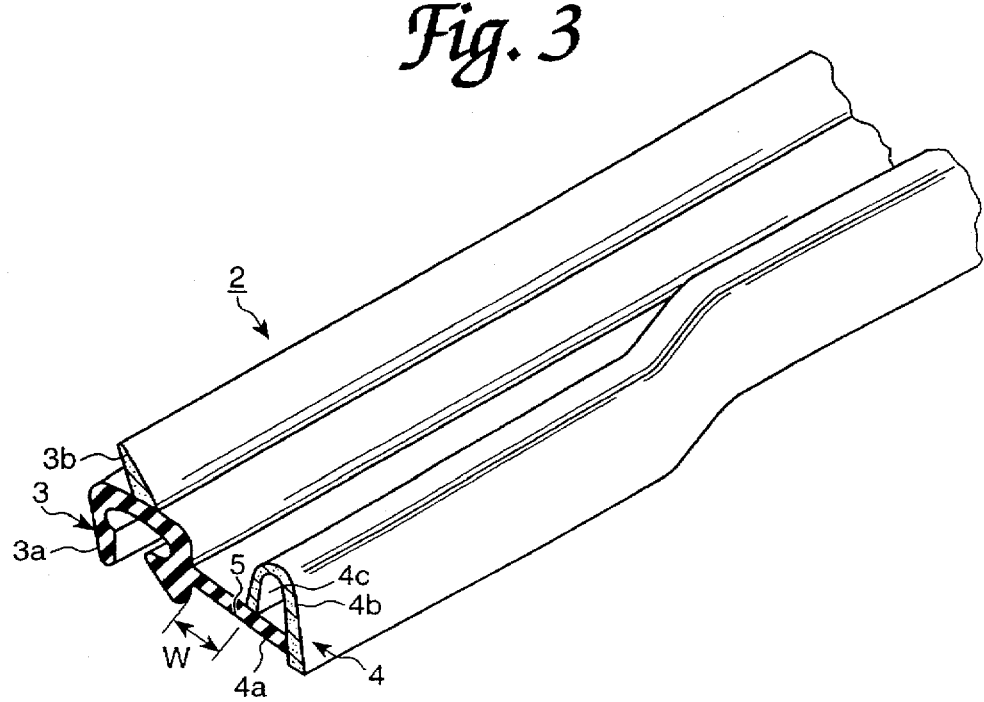
FIG. 3 is a perspective view of a portion of an exemplary weather strip.

As shown in FIG. 2, an elongated weather strip 2 is mounted, for example, on a peripheral edge of a door opening in an automobile vehicle body 1. This weather strip 2 is formed from, for example, extruded EPDM (ethylene-propylene-diene terpolymer) by an extrusion method described below. Weather strip 2 generally has a uniform cross-sectional shape over most of its entire length. As seen in FIG. 3, weather strip 2 includes a trim portion 3 with an inverted, generally. U-shaped cross-section for engaging a flange (not shown) on the vehicle body 1, a seal portion 4 disposed outwardly (right side in FIG. 3) of the trim portion 3 with respect to the vehicle body, and a connecting portion 5 interconnecting the trim portion 3 and the seal portion 4. More specifically, the trim portion 3 includes a body 3a, and a sub-lip portion 3b extending angularly from the body 3a. The body 3a is made of, for example, solid EPDM rubber while the sub-lip portion 3b is made of, for example, foamed EPDM sponge rubber. The connecting portion 5 is also made of, for example, EPDM solid rubber. The seal portion 4 has a base portion 4a connected to the connecting portion 5, and a cushioning portion 4b formed into a curved configuration.

A hollow portion 4c is defined by the base portion 4a and the cushioning portion 4b. The base portion 4a is made of, for example, solid EPDM rubber, as is connecting portion 5, while the cushioning portion 4b is made of, for example, foamed. EPDM sponge rubber.

When the weather strip 2 is attached to the vehicle body 1, the body 3a of the trim portion 3 is mounted on a retainer provided on the vehicle body 1. The cushioning portion 4b of the seal portion 4 and the sub-lip portion 3b are brought into contact with the door and the vehicle body 1 substantially to form a seal between an interior and an exterior of the vehicle. Part of the vehicle body 1 is covered by the seal portion 4, and this covering advantageously enhances the aesthetic appearance of the vehicle when viewed from the exterior.

In this embodiment, the connecting portion 5 of the weather strip 2 has a width W, which can vary according to a location along the length of the weather strip 2.

Figure 1:
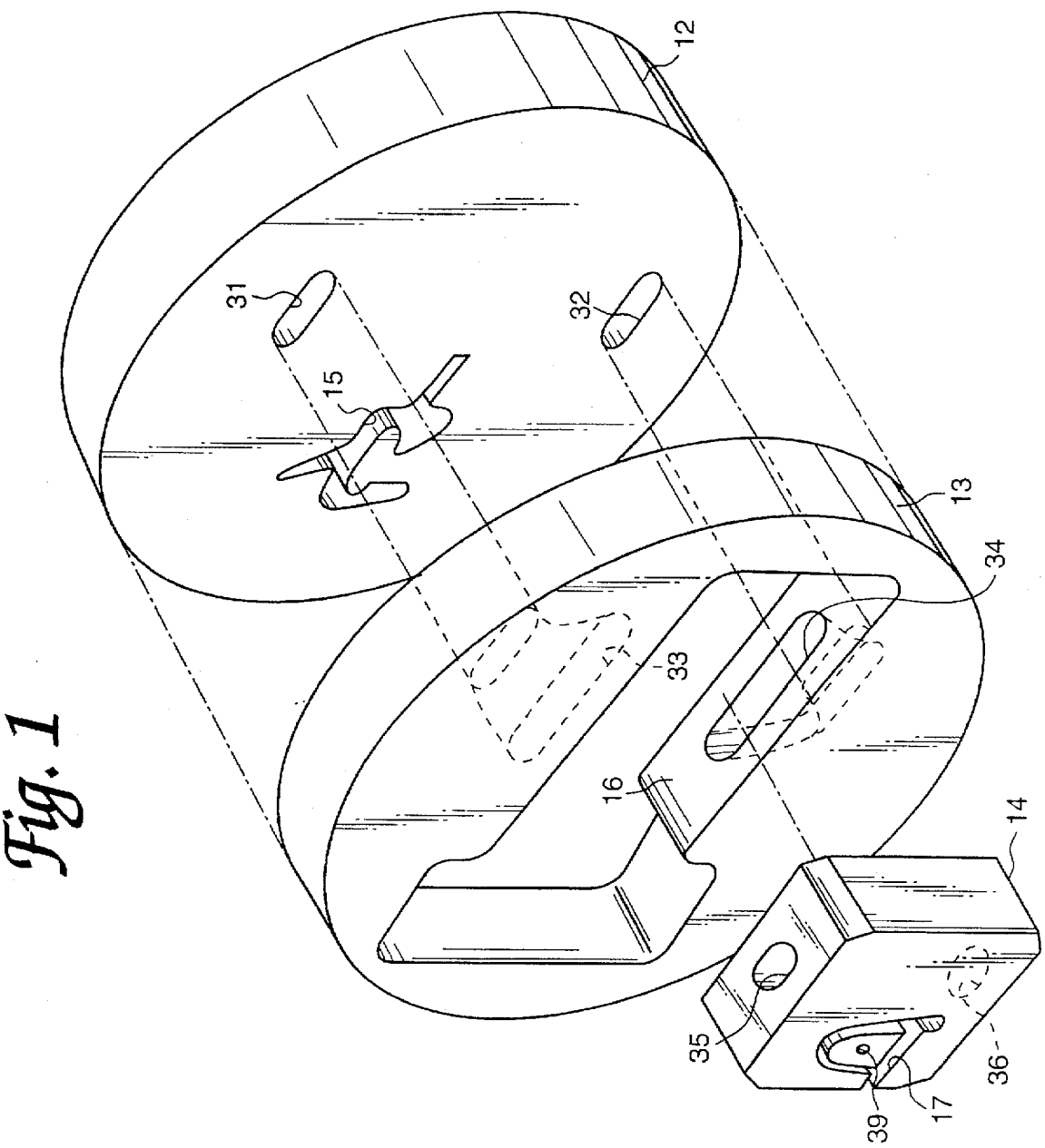
FIG. 1 is a perspective view of an apparatus for forming a weather strip by extrusion, according to the invention.
Figure 8:
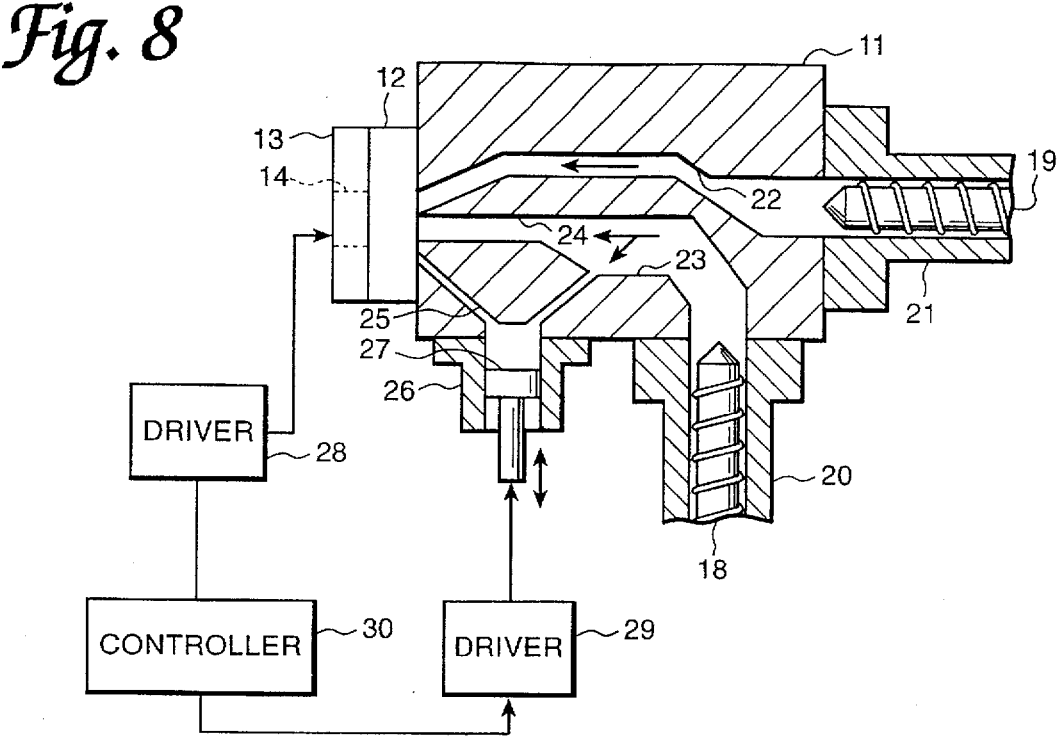
FIGS. 8 to 10 are system illustrations showing a mechanism for adjusting the flow rate of rubber to the extrusion head, according to the present invention.

According to the apparatus shown in FIGS. 1 and 8, unvulcanized EPDM solid and sponge rubber are extruded forwardly (to the left, as seen in FIG. 8) through the extruding apparatus into a predetermined shape. More specifically, the apparatus comprises a head 11 generally for moving unvulcanized rubber through the apparatus, a main die plate 12 fixed to a front face of the head 11, a fixed die plate 13 fixed to a front face of the main die plate 12 opposite from the head 11, and a movable die 14 slidably disposed in the fixed die plate 13.

Figure 4:
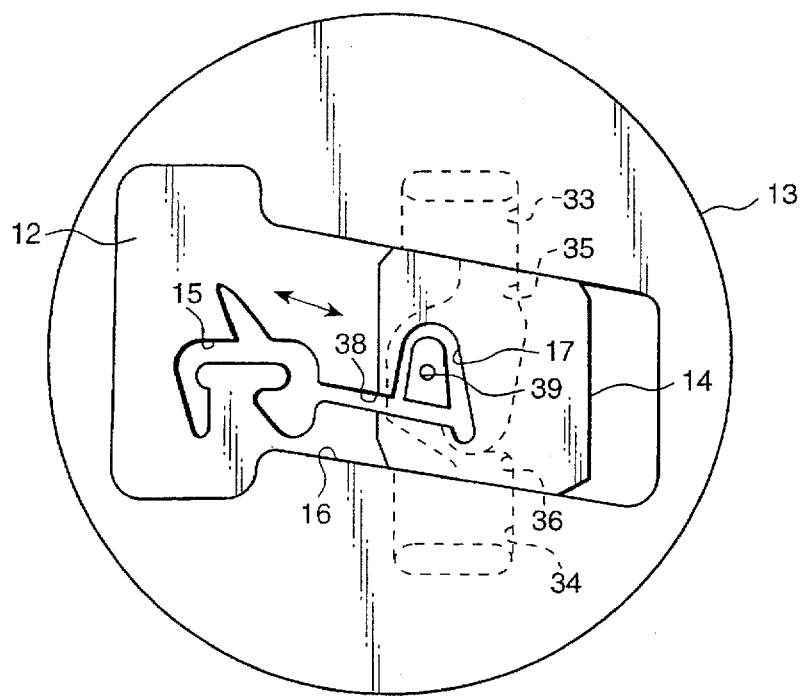
FIG. 4 is a front-elevational view of a main die plate and a fixed die plate provided with a movable die.
Figure 5:
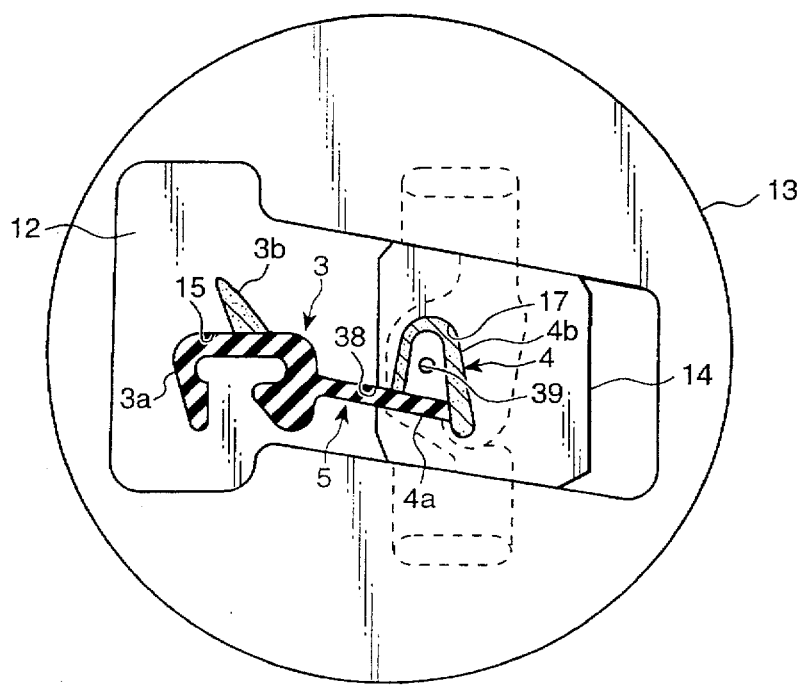
FIG. 5 is a front-elevational view of the die plates as seen in FIG. 4, showing a cross-section of the weather strip being extruded.

More specifically, the main die plate 12 has a first opening 15 formed therethrough shaped to form the trim portion 3 of the weather strip 2 and part of the connecting portion 5, as shown in FIGS. 1, 4, and 5. Main die plate 12 also has communication passages 31 and 32 formed therein to form part of a rubber material supply passage to the movable die 14.

The fixed die plate 13 is mated with and fixedly secured to the front face of the main die plate 12 on a side thereof opposite from head 11. The fixed die plate 13 has an opening formed therethrough defining a reception portion 16 through which the shaped trim portion 3 is passed without contacting the fixed die plate 13 and also slidably receiving the movable die 14. Fixed die plate 13 also has opposing supply passages 33 and 34 formed therein, which communicate with communication passages 31 and 32, respectively, formed in the main die plate 12. Supply passages 33 and 34, in turn, communicate with discharge passages 35 and 36 formed in the movable die 14.

The movable die 14 is received in the reception portion 16, and is slidable therein along a direction along the width of the connecting portion 5, preferably in sliding contact with the front face of the main die plate 12. The movable die 14 has a second opening 17 formed therein conforming in shape to the seal portion 4 and a remaining part of the connecting portion 5. Discharge passages 35 and 36 formed therein communicate with the second opening 17 to supply rubber material thereto.

In this embodiment, the head 11 is provided with a mechanism for effecting a necessary discharge of unvulcanized rubber, which varies in accordance with the movement of the movable die 14. An extruder 20 having a screw 18 for extruding unvulcanized (EPDM solid rubber), is provided adjacent to an end of the head 11 (right end in FIG. 8). Another extruder 21 having a screw 19 for extruding unvulcanized EPDM sponge rubber is also provided at the rear end of the head 11. In this embodiment, only the discharge rate of EPDM solid rubber for forming the connecting portion 5 is varied. Therefore, the mechanism for controlling the discharge rate of the EPDM solid rubber will be described below.

A variable portion material flow passage 23 for feeding unvulcanized EPDM solid rubber is formed in the head 11. The variable portion material flow passage 23 is forked halfway therethrough into a steady portion material flow passage 24 and a division portion material flow passage 25.

A flow passage for feeding EPDM solid rubber from the division portion material flow passage 25 to the opening for forming the connecting portion 5 is formed in the main die plate 12. Flow passages for feeding EPDM solid rubber from the steady portion material flow passage 24 to those portions of die plates 12 and 13 for forming the body 3a and the base portion 4a are formed in the main die plate 12.

An adjustment device for controlling the EPDM solid rubber discharge rate, so as to offset a variation in rubber flow rate of the unvulcanized rubber, is provided in the division portion material flow passage 25 between the opposite ends thereof. A cylinder 26 (or other variable volume portion) is provided in communication with division portion material flow passage 25. A piston 27 is slidably received in the cylinder 26. With this construction, the unvulcanized rubber, flowing through the division portion material flow passage 25, is received in the cylinder 26, and the volume of the cylinder 26 can be adjusted by moving the piston 27.

As shown in the drawings, in this embodiment, drive devices 28 and 29 are provided for moving the movable die 14 and the piston 27, respectively. Each of these drive devices 28 and 29 may be, for example, by a servo motor. In this embodiment, a controller 30 is provided for controlling the drive devices 28 and 29, such that the movement of the movable die 14 and the piston 27 can be adjusted.

Figure 11:
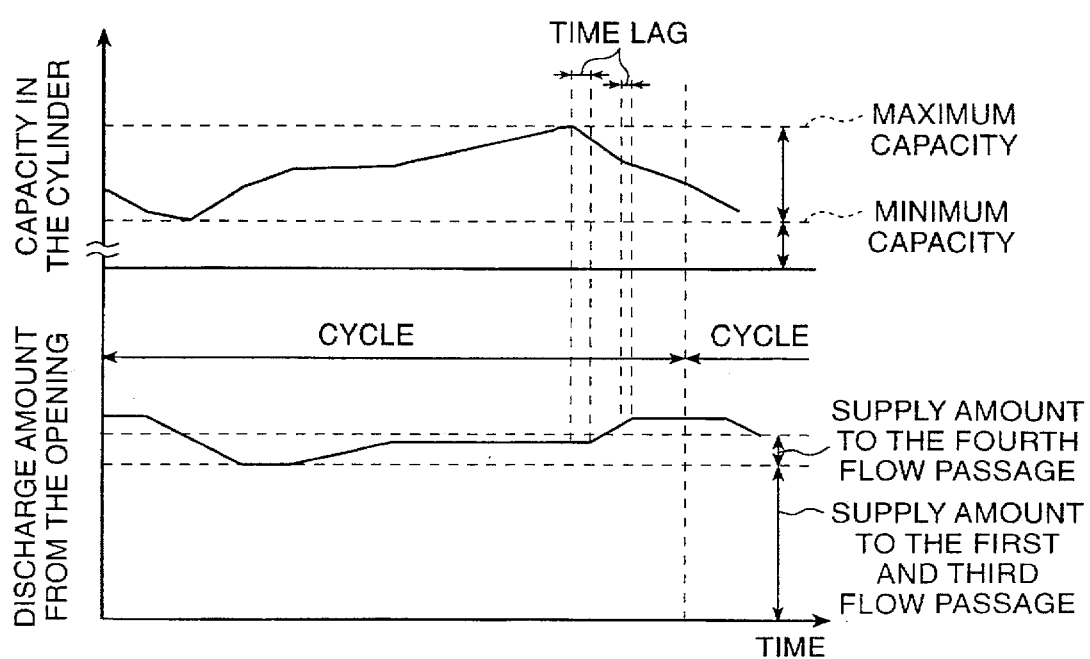
FIG. 11 is a timing chart showing the relation between the capacity in a cylinder and one cycle time, and the relation between the amount of discharge from an opening and one cycle time.
Figure 12:
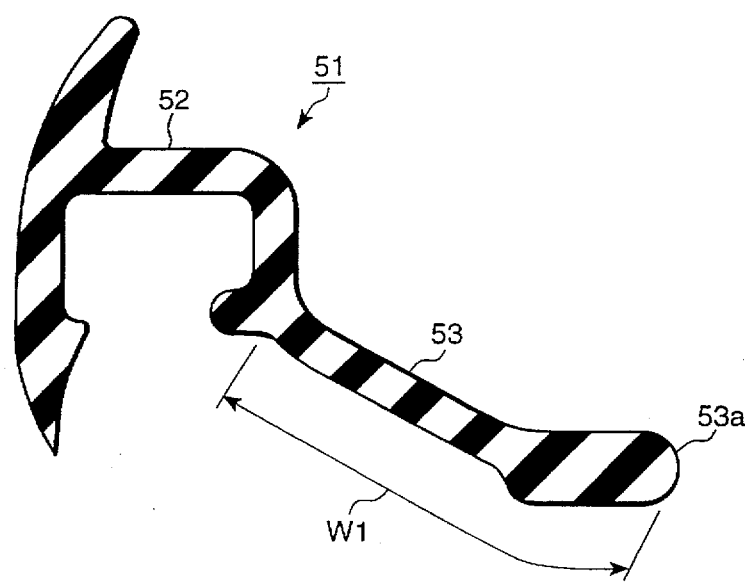
FIG. 12 is a cross-sectional view of a weather strip produced by a conventional technique.
Figure 13:
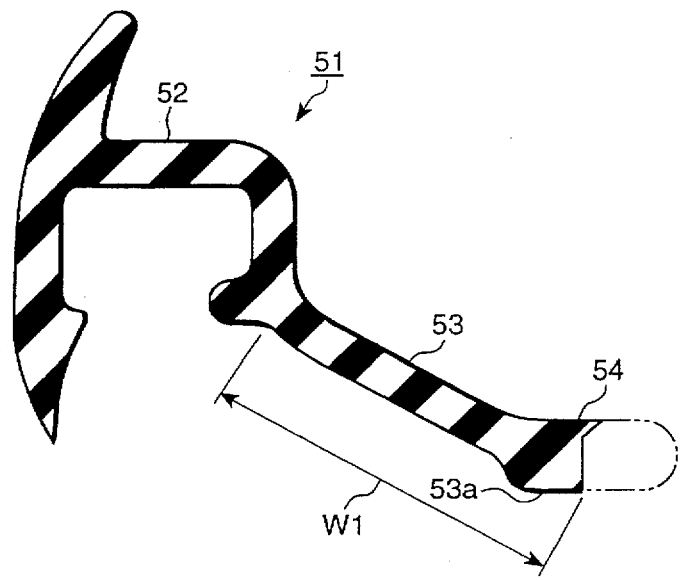
FIG. 13 is a view similar to FIG. 12, but showing a disadvantage of a conventional manufacturing technique.
Figure 14:
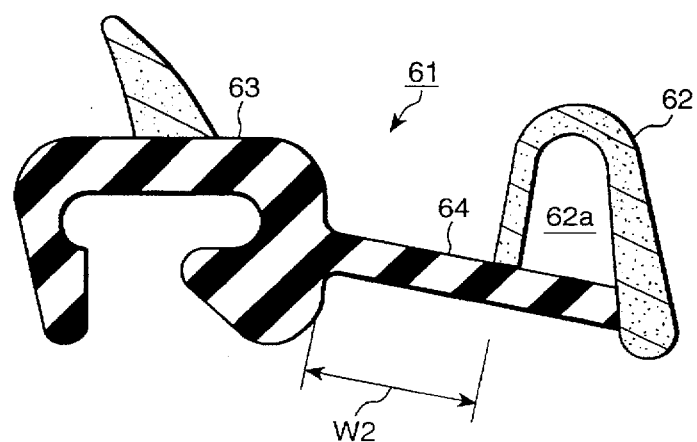
FIG. 14 is a cross-sectional view of yet another conventional weather strip.

In this embodiment, the relation between the capacity of the cylinder 26 and time corresponding to one cycle of production of one weather strip 2, as well as the relation between the rubber discharge rate from the first opening 15 and this one cycle time, is, for example, as shown in FIG. 11. More specifically, the flow of unvulcanized rubber provided to the steady portion material flow passage 24, as well as the flow of unvulcanized rubber provided to the division portion material flow passage 25, is substantially constant at the outset. However, when the movable die 14 is moved inwardly so as to reduce the area of the opening for forming the connecting portion 5, the rate at which unvulcanized rubber is provided to the division portion material flow passage 25 generally becomes excessive. To compensate, it is necessary to decrease the discharge rate into division portion flow passage 25. In such a case, the piston 27 is retracted to increase the volume of the cylinder 26. While the volume of the piston 26 is being increased, the unvulcanized rubber, flowing through the division portion material flow passage 25, is temporarily held in the cylinder 26 having an increased volume, so that the discharge of the unvulcanized rubber from the division portion material flow passage 25 decreases. As a result, the rate at which the unvulcanized rubber is discharged from the first opening 15 decreases.

On the other hand, when the movable die 14 is moved outwardly so as to increase the area of the opening for forming the connecting portion 5, the amount of unvulcanized rubber provided thereto generally becomes insufficient. To compensate, it is necessary to increase the discharge rate of rubber. In such a case, the piston 27 is extended so as to decrease the volume of the cylinder 26. While the volume of the cylinder 26 is being decreased, the unvulcanized rubber, stored in the cylinder 26, is forced to flow into the division portion material flow passage 25, in addition to the unvulcanized rubber already flowing through the division portion material flow passage 25. As a result, the rate of discharge from the division portion material flow passage 25 increases, so that the amount of unvulcanized rubber discharged from the first opening 15 increases. However, there is a slight time lag between the adjustment of the cylinder 26 and the change in discharge rate from the first opening 15. In this respect, the timing for actuating the drive devices 28 and 29, which drove movable die 14 and piston 27, respectively, are suitably adjusted by the controller 30.

In this embodiment, the volume or capacity in the head 11 is designed to be reduced to a minimum at least once per one cycle. With this arrangement, the unvulcanized rubber in the cylinder 26 all flows into the division portion material flow passage 25 at least once per one cycle.

The mechanism for securing the required discharge of the EPDM solid rubber for forming the connecting portion 5 has been described above.

A portion material flow passage 22 for feeding unvulcanized EPDM sponge rubber from an extruder 21 is also provided in the head 11. This unvulcanized sponge rubber is used to form the sub-lip portion 3b of the trim portion 3 and the cushioning portion 4b of the seal portion 4, which have a constant configuration. Therefore, the amount of unvulcanized rubber flowing through the ordinary portion material flow passage 22 is not varied. Therefore, a detailed description of this extruding mechanism will be omitted here.

A plurality of branch passages for feeding the EPDM solid rubber at varying discharge rates and the EPDM sponge rubber at a substantially constant discharge rate to the openings 15 and 17, respectively, are formed in the head 11 (or in the main die plate 12). More specifically, as shown in FIG. 1, certain ones of the branch passages communicate with the first opening 15 in the main die plate 12, and the EPDM solid rubber and the EPDM sponge rubber are discharged forwardly from the first opening 15.

An upper communication passage 31 and a lower communication passage 32 are formed through the main die plate 12 in space relation to the first opening 15. These communication passages 31 and 32 communicate with respective branch passages to receive rubber discharged from the head 11. More specifically, EPDM sponge rubber is supplied to the upper communication passage 31 via the associated branch passage, whereas EPDM solid rubber is supplied to the lower communication passage 32 via another associated branch passage.

An upper supply passage 33 communicating with the upper communication passage 31, and a lower supply passage 34 communicating with the lower communication passage 32, are formed in the fixed die plate 13 mounted on the front side of the main die plate 12. The pair of upper and lower supply passages 33 and 34 are disposed opposite one another with respect to the reception portion 16, as seen, for example, in FIG. 1. Namely, EPDM sponge rubber and EPDM solid rubber are supplied in a direction substantially perpendicular to the direction of the length of the weather strip 2, and are fed from upper and lower supply passages 33 and 34, respectively, to an upper discharge or inlet passage 35 and a lower discharge or inlet passage 36 formed in the movable die 14. Then, the respective unculvanized rubber materials are discharged from the second opening 17.

A notch structure 38, serving as a connecting device for positively connecting the formed seal portion 4 to the connecting portion 5, is provided in the movable die 14. Part of the EPDM solid rubber, discharged from the first opening 15 to form the connecting portion 5 enters the notch 38 so that the EPDM solid rubber for forming the connecting portion 5 is joined to the EPDM solid rubber for forming the base portion 4a of the seal portion 4. An air vent hole 39 is formed in the movable die 14 for positively forming the hollow portion 4c shown in FIG. 3.

According to the present invention, a production apparatus is provided for forming the extruded weather strip 2 in its final form. More specifically, this production apparatus comprises a conventional vulcanizer for vulcanizing the extruded unvulcanized rubber from the above-described apparatus, a conventional cooling device for cooling the vulcanized extruded EPDM rubber, and a conventional cutter device for cutting the continuous extruded EPDM rubber product into a predetermined length to provide the weather strip 2 in a final form.

Next, the operation of the extrusion apparatus and the production apparatus for producing the weather strip 2 will now be described.

First, the extruders 20 and 21 are respectively driven to feed the unvulcanized rubber. The EPDM solid rubber extruded from the extruder 20 flows through the variable portion material flow passage 23 and is divided to flow into the steady portion material flow passage 24 and the division portion material flow passage 25. The unvulcanized EPDM solid rubber flowing through the steady portion material flow passage 24 is fed directly to the first opening 15 and the lower communication passage 32 in the main die plate 12 via respective flow passages (not shown). The unvulcanized rubber flowing through the division portion material flow passage 25 passes past the open end of the cylinder 26, and is fed mainly to the portion of the first opening 15 corresponding to the connecting portion 5 in the main die plate 12.

At first, the movable die 14 is located at an outermost position (right most position in FIG. 5) in the reception portion 16, as shown in FIG. 5. In this condition, the unvulcanized EPDM solid rubber flowing through the flow passages 24 and 25 is discharged to the first opening 15 and the lower communication passage 32 via suitably arranged passages provided therefor (not shown). The unvulcanized EPDM sponge rubber extruded from the extruder 21 flows through the ordinary portion material flow passage 22 and is fed by a different passage than those feeding the solid EPDM rubber to an upper portion of the first opening 15 for forming the sub-lip portion 3b of the first opening 15 and the upper communication passage 31 via suitably arranged passages provided therefor (not shown). As a result, the trim portion 3 and the connecting portion 5, generally in their final shape, are formed by the two unvulcanized rubber materials extruded from the first opening 15.

Figure 7:
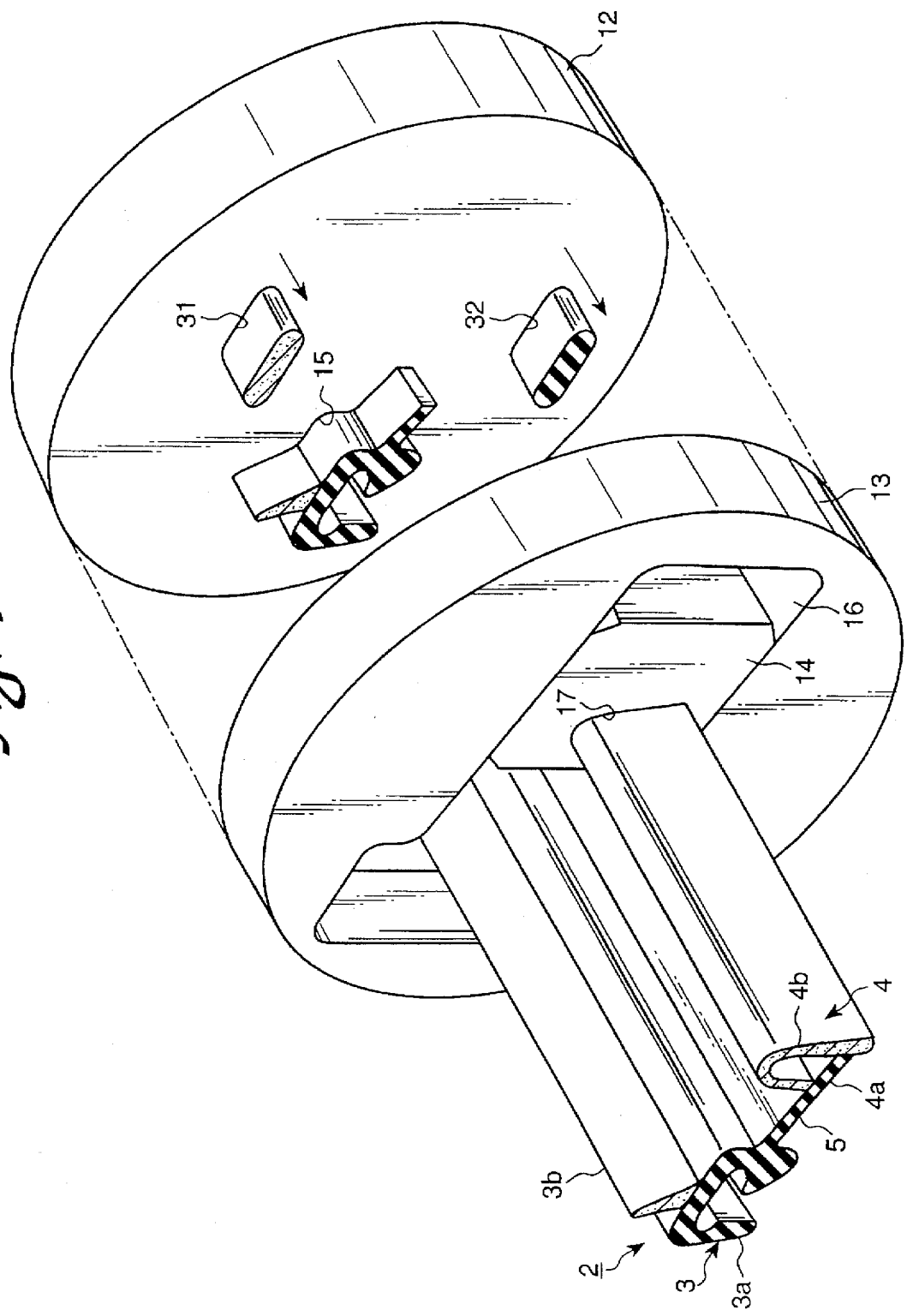
FIG. 7 is a perspective view of the weather strip forming apparatus, illustrating a flow of unvulcanized rubber for forming the weather strip.

Then, the trim portion 3 and the part of the connecting portion 5 discharged from first opening 15 is fed toward the reception portion 16 in the fixed die plate 13, and passes therethrough in a noncontacting manner. The unvulcanized EPDM sponge rubber extruded from the upper communication passage 31 is fed to the upper supply passage 33 in the fixed die plate 13, and is further fed therefrom to the upper discharge passage 35 in the movable die 14. On the other hand, the unvulcanized EPDM solid rubber extruded from the lower communication passage 32 is fed to the lower supply passage 34 in the fixed die plate 13, and is further fed therefrom to the lower discharge passage 36 in the movable die 14. Then, the two unvulcanized rubber materials are joined together in the vicinity of the second opening 17, and are discharged forwardly from the second opening 17, as shown in FIG. 7. As a result, the seal portion 4 of the weather strip is formed. Also, the seal portion 4 and the connecting portion 5 are connected together with the aid of the notch mechanism 38.

Figure 9:
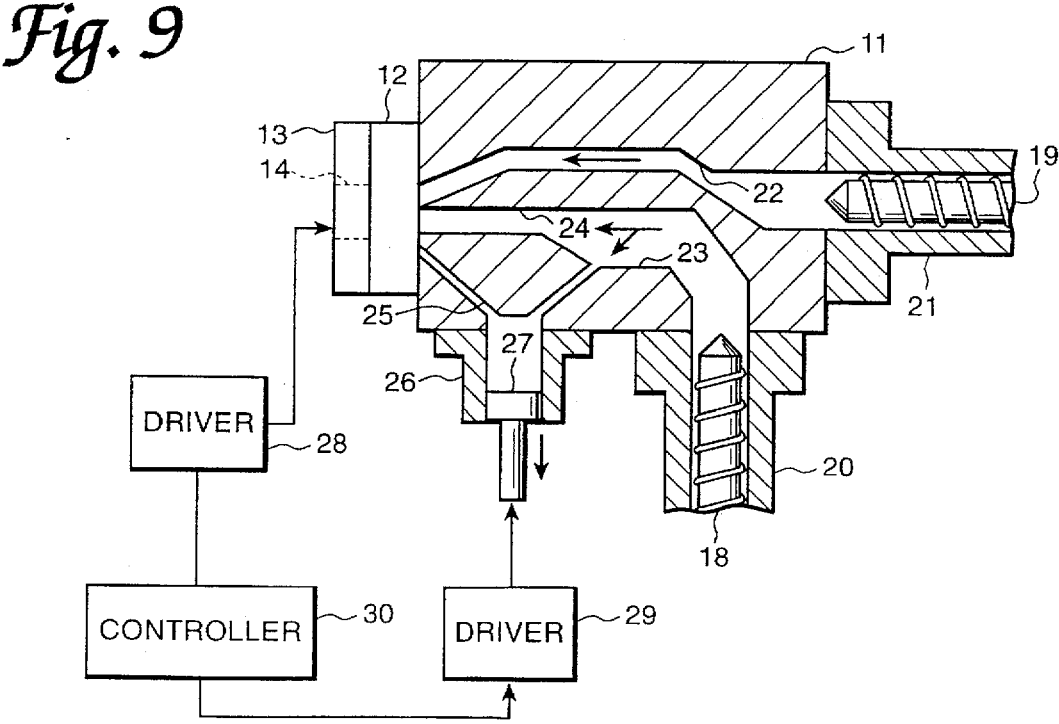

In the above extruding operation, when the controller 30 decides that the width W of the connecting portion 5 should be decreased, drive devices 28 and 29 are suitably according to the control of the controller 30. More specifically, the piston 27 is retracted by the drive device 29 as shown in FIG. 9. By this retraction, the volume of the cylinder 26 is increased. As a result, a portion of the unvulcanized rubber flowing through the division portion material flow passage 25 is stored in the cylinder 26, so that the flow rate of the rubber through the division portion material flow passage 25 decreases. Therefore, the rate at which unvulcanized EPDM solid rubber is discharged from the first opening 15 decreases. Here, the speed at which the piston 27 is retracted is proportional to the rate at which the unvulcanized rubber flows into the cylinder 26, so that the rate of discharge of the rubber from the division portion material flow passage 25 correspondingly decreases.

Figure 6:
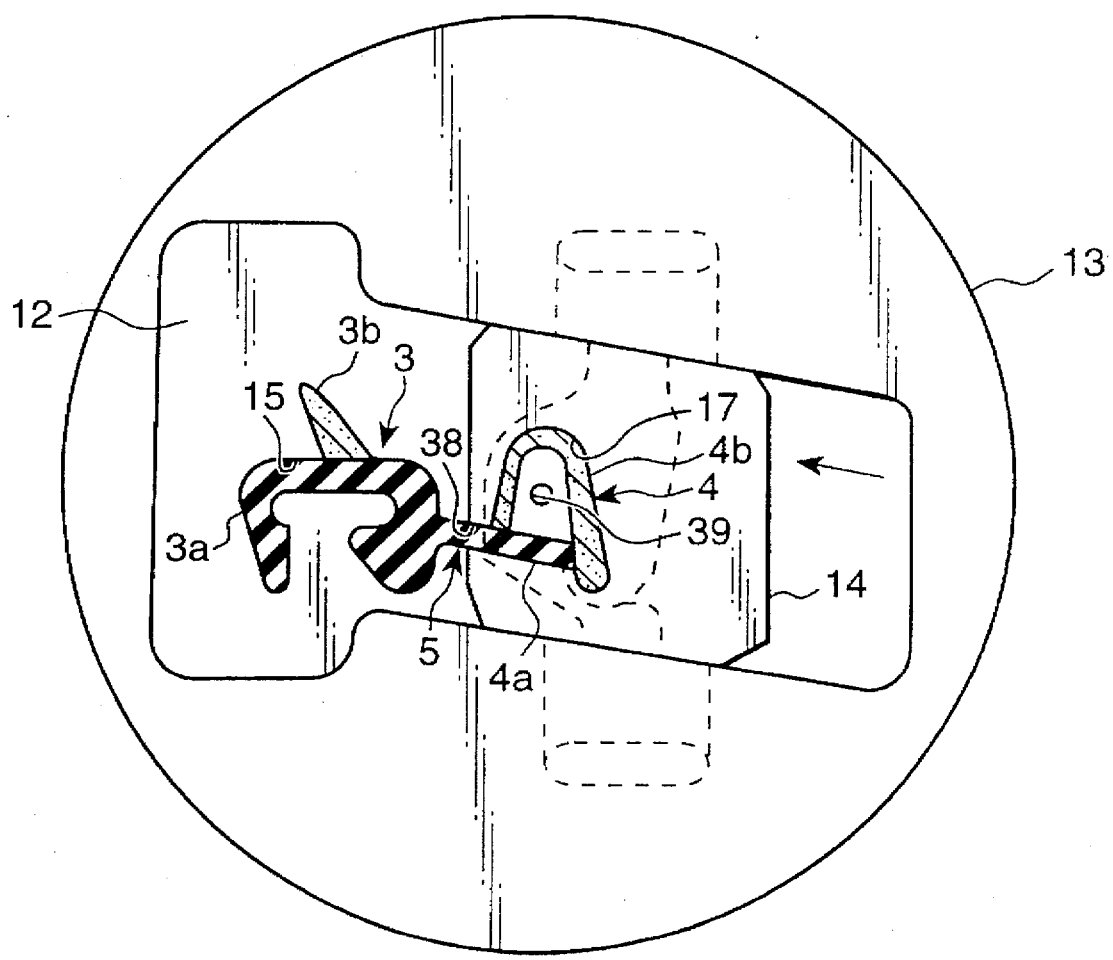
FIG. 6 is a front-elevational view of the main portion of the die plates as seen in FIG. 5, showing the movement of the movable die of the present invention compared to its position as seen in FIG. 5.

Then, with a slight time lag, the movable die 14 is moved inwardly (to the left in FIG. 6) by the drive device 28, as shown in FIG. 6. Since the movable die 14 is thus moved inwardly, the second opening 17 for forming the seal portion 4 is also moved inwardly. Therefore, the width of the opening for forming the connecting portion 5 is reduced smoothly and continuously. At this time, while the area of the opening for forming the connecting portion 5 is thus reduced, the rate at which the unvulcanized EPDM solid rubber is discharged from the first opening 15 is also decreased, as described above. Therefore, the flow rate of the discharged, unvulcanized rubber is kept generally constant.

Figure 10:
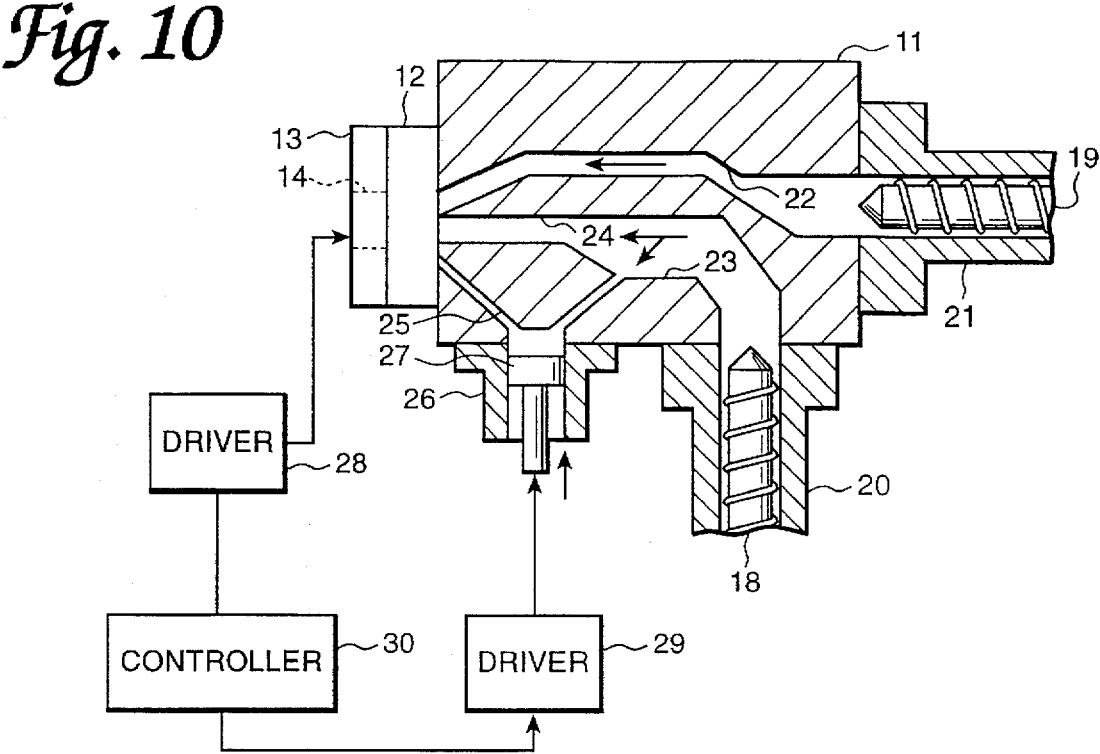

In contrast, when the controller 30 decides that the width W of the connecting portion 5 should be increased, (that is, to restore the connecting portion 5 into the initial width), an operation reverse to the above operation is carried out. More specifically, the piston 27 is extended by the drive device 29, as shown in FIG. 10. By this extension, the volume of the cylinder 26 is decreased. As a result, the unvulcanized rubber, stored in the cylinder 26 flows into the division portion material flow passage 25, in addition to the unvulcanized rubber already flowing in the division portion material flow passage 25, thereby increasing the rate at which the rubber is discharged from the division portion material flow passage 25. Therefore, the amount of unvulcanized rubber discharged from the first opening 15 increases. Here, the speed of extension of the piston 27 is proportional to the amount of flow of the unvulcanized rubber out of the cylinder 26 per unit time, so that the rate at which rubber is discharged from the division portion material flow passage 25 increases.

Then, with a slight time lag, the movable die 14 is moved outwardly (to the right in FIG. 6) by the drive device 28, so that the width of the connecting portion 5 is increased smoothly and continuously. Thus, by moving the movable die 14 inwardly and outwardly and by correspondingly adjusting the rate of discharge of the unvulcanized rubber for forming the connecting portion 5, the side edge portion of the connecting portion 5 can be suitably varied inwardly and outwardly so that the width W of that portion corresponding to the connecting portion 5 can be changed. In this manner, the weather strip 2 is extruded or formed into a predetermined configuration by the use of the two unvulcanized rubber materials.

Thereafter, the thus formed, unvulcanized rubber product is fed to the production apparatus comprising a vulcanizer, a cooling device, and a cutter. More specifically, the unvulcanized rubber product is vulcanized, cooled, and then cut into a predetermined length. As a result, a weather strip 2 is obtained which varies in width according to longitudinal position therealong. The seal portion 4 formed at one side edge portion of the weather strip 2 is uniform in shape (appearance) at both the variable width portion and straight portions of the weather strip 2.

As described above, in this embodiment, the movable die 14 is slidingly moved along the width direction of the connecting portion 5 so as to change the width W of the connecting portion 5. Therefore, in contrast with the above-described conventional technique in which unvulcanized rubber may intrude into the boundary between the shutter and the orifice plate, no burrs will form on the outer side edge of the weather strip 2. Therefore, no burrs are formed on the design purpose side of the weather strip 2. As a result, the sealing function of the seal portion 4 can be fully realized, and the aesthetic appearance of the weather strip can be enhanced. And besides, in contrast to the conventional technique in which the width of the lip is changed by cutting using a cutter, it is possible to reduce the generation of scrap portions of unvulcanized rubber. As a result, manufacturing costs can be reduced.

In the present invention, even when extruding a weather strip 2 with a specially shaped hollow portion 4c, as in this embodiment, the second opening 17 in the movable die 14 can be formed into such a special configuration. By moving the movable die 14, the width of the connecting portion 5 can be easily varied while maintaining the configuration of the hollow portion 4c.

In this embodiment, to form the seal portion 4, the unvulcanized rubber materials are supplied from the upper and lower supply passages 33 and 34, respectively, disposed in opposed relation to each other in a direction generally perpendicular to the direction of the length of the weather strip 2. Therefore, stresses due to the unvulcanized rubber materials supplied from the supply passages 33 and 34 are applied to the movable die 14; however, these stresses substantially cancel each other since the upper and lower supply passages 33 and 34 are disposed in opposed relation to each other. Therefore, resistance to the sliding movement of the movable die 14 in the reception portion 16 is relatively and advantageously small. Accordingly, the movable die 14 can be easily operated or moved, and the lifetime of the die can be prolonged. In addition, energy can be saved.

In this embodiment, a mechanism in the head 11 enables variations in internal pressure of the orifice due to the movement of the movable die 14 to be suppressed. Also, the volume of the head 11 is adjusted to compensate for variations in flow velocity. First, the material flow passages 24 and 25 are provided in the head 11. With this construction, even if the internal pressure is slightly varied when the movable die 14 is moved, such pressure variation can be compensated for mainly in the division portion material flow passage 25.

The present invention is not to be limited to the above embodiment, and the following modifications can be made, for example:

(1) In the above embodiment, although the weather strip 2 is made from two types of EPDM rubber, it may be formed by any other suitable rubber. Although the above embodiment of the invention is directed to a weather strip 2 for the peripheral edge of a door opening in a vehicle body 1, the invention can be applied to other types of weather strip for mounting on other portions of the vehicle body. Therefore, the weather strip can have any suitable configuration as long as it includes the first and second function portions, and the connecting portion interconnecting them as seen in transverse cross section. For example, the invention can be directed to a type of weather strip which has a tongue-like lip instead of the hollow seal portion 4.

(2) In the above embodiment, although the two extruders 20 and 21 are used for extruding two types of rubber materials (i.e., EPDM solid rubber and sponge rubber), one extruder can be used, or more than two extruders can be used.

(3) In the above embodiment, a mechanism is provided for suppressing pressure variations and for adjusting the capacity of the head 11 to avoid changes of the discharge rate; however, if the variation in the width W is small, and the internal pressure does not vary greatly, then such a mechanism may be eliminated.

(4) In the above embodiment, to form the seal portion 4, the unvulcanized rubber materials are supplied respectively from the upper and lower supply passages 33 and 34 which are disposed in fixed die plate 13 in opposed relation to each other and in a direction generally perpendicular to the length direction of the weather strip 2. However, this construction is not always necessary. Also, two or more pairs of opposed supply passages may be provided.

Other extensions of the presently disclosed invention are described below.

(a) In extruding the weather strip in which the width of the connecting portion is varied according to a longitudinal position thereof by moving the movable die, the unvulcanized rubber is caused to flow through the plurality of flow passages in the head, and at least one of these flow passages directly receive a pressure variation due to the movement of the movable die. With this construction, when the movable die moves, so that the area of the opening for the unvulcanized rubber is changed, it is possible that at least one flow passage is subjected to a pressure variation in the head, and this pressure variation propagates toward the proximal end of this passage. Therefore, if this pressure variation is very small, it is sufficiently attenuated during the propagation, and is substantially suppressed. Therefore the velocity of discharge of the unvulcanized rubber will not vary as much. As a result, the configuration of the weather strip can be stabilized, so that the weather strip of a desired configuration can be obtained.

(b) Also, in the method described above in (a), the head capacity adjusting mechanism for adjusting the volume of the unvulcanized rubber in the head is provided in the flow passage (formed in the head for flowing the unvulcanized rubber therethrough) intermediate the opposite ends thereof, and the discharge rate of the unvulcanized rubber from the above opening is adjusted each cycle by the head capacity adjusting mechanism. With this construction, even when the area of the opening at the discharge portion varies according to the movement of the movable die, the volume of the head, and hence, the discharge rate can be adjusted in accordance with this variation. Therefore, the variation of the pressure within the head, as well as the variation of the velocity of discharge of the unvulcanized rubber, can be substantially suppressed.

(c) In the weather strip extrusion-forming method described in the above paragraph (b), the volume adjusting mechanism can comprise the cylinder and the piston slidably received in this cylinder. With this construction, by slidingly moving the piston in the cylinder, the volume of the unvulcanized rubber in the head can be easily adjusted.

As described above, in the method and apparatus of the present invention for extrusion-forming the weather strip having the first and second function portions and the connecting portion interconnecting these function portions, in which the connecting portion is varied in width according to a longitudinal position thereof, excellent advantages are realized, in that the function portions can fully perform their respective intended functions, that the appearance of the resulting weather strip can be improved, and that the width of the connecting portion can be easily varied even if each function portion has a complicated, special configuration.

In the present invention, the movable die is slidably received in the reception portion, and with this construction an excellent advantage is realized that the resistance to the sliding movement of the movable die is small, so that the movable die can be easily moved, thereby prolonging the lifetime of the die and also saving the energy.

Also, the formed second function portion can be positively connected to the connecting portion by the connecting structure provided in the movable die.

What is claimed is:

1. A method for extruding a weather strip having first and second function portions and a connecting portion interconnecting the first and second function portions, the method comprising the steps of:

forming the first function portion and a first part of the connecting portion by forcing a rubber material through a first extrusion opening formed in a first die plate; and simultaneously passing the formed first function portion and the first part of the connecting portion through an opening formed in a second die plate while forming the second function portion and an additional part of the connecting portion adjoined to the first part of the connecting portion by forcing a rubber material through a second extrusion opening formed in a movable die slidably disposed in the second die plate after providing the rubber material to opposite sides of the movable die, wherein the movable die has passages formed therein connecting between the respective opposite sides to which the rubber material is supplied, and the second extrusion opening formed, and varying a width of the connecting portion by moving the movable die within the second die plate as the rubber material is forced through the second extrusion opening.

2. A method as in claim 1 wherein the first function portion comprises a weather strip mounting portion.

3. A method as in claim 1 wherein the second function portion comprises a weather strip sealing portion.

4. The method according to claim 1, further including a step of providing a first rubber material to a first side of the die and a second rubber material, different from the first rubber material, to an opposite side of the die.

5. The method according to claim 1, wherein said step of forming the first function portion and the first part of the connection portion includes forcing different rubber materials through the opening formed in the first die plate.

6. The method according to claim 1, wherein an unvulcanized rubber material is used.

7. The method according to claim 1, further including a step of varying a rate at which the rubber material is provided to the first die plate.

8. The method according to claim 1, wherein said steps of moving the die disposed in the fixed die plate and varying the rate at which the rubber material is provided to the first die plate are performed in correspondence with one another.

9. The method according to claim 8, wherein, when the die is moved so as to increase the width of the connecting portion, the rate at which the rubber material is provided to said first die plate is increased.

10. The method according to claim 8, wherein, when the die is moved so as to decrease the width of the connecting portion, the rate at which the rubber material is provided to said first die plate is decreased.

11. The method according to claim 7, wherein the rubber material is provided to the first die plate via a passage, said step of varying the rate at which the rubber material is provided to the first die plate including a step of varying a volume of the passage through which the rubber material is provided to the first die plate.

12. The method according to claim 8, wherein the rubber material is provided to the first die plate via a passage, said step of varying the rate at which the rubber material is provided to the first die plate including a step of varying a volume of the passage through which the rubber material is provided to the first die plate.

13. The method according to claim 9, wherein the rubber material is provided to the first die plate via a passage, said step of increasing the rate at which the rubber material is provided to the first die plate including a step of decreasing a volume of the passage through which the rubber material is provided to the first die plate.

14. The method according to claim 10, wherein the rubber material is provided to the first die plate via a passage, said step of decreasing the rate at which the rubber material is provided to the first die plate including a step of increasing a volume of the passage through which the rubber material is provided to the first die plate.

15. An apparatus for extruding a weather strip having a first function portion, a second function portion, and a connecting portion therebetween and having a variable width, comprising:

a head disposed on a downstream end of an extruder and having at least one passage formed therethrough to allow passage of an unvulcanized rubber;

a main die plate connected to said head, said main die plate having a first extrusion opening formed therethrough shaped to form the first function portion and a first part of the connecting portion, and first and second communication openings formed therethrough, said first extrusion opening and said first and second communication openings being in communication with said at least one passage formed in said head;

a fixed die plate connected to said main die plate on a side thereof opposite from said head, said fixed die plate having a reception opening formed therethrough in alignment with said first extrusion opening formed in said main die plate to permit movement of the first function portion and the first part of the connecting portion through the reception opening, said fixed die plate also including a movable die slidably disposed therein to move toward and away from said reception opening, said movable die having a second extrusion opening formed therein shaped to form the second function portion and a second part of the connecting portion, said movable die being disposed relative to said first extrusion opening in said main die plate so that the first and second parts of the connecting portion interconnect with one another, said fixed die plate further including first and second supply passages positioned on opposite sides of said movable die, and formed in said fixed die plate for interconnecting said first and second communication openings of said main die plate with first and second inlet passages provided on opposite sides of said movable die, said first and second inlet passages arranged to interconnect between said first and second supply passages and said second extrusion opening.

16. An apparatus for extruding molding having a first portion and a second portion, comprising:

a head disposed on a downstream end of an extruder and having at least one passage formed therethrough to allow passage of an extrusion material;

a main die plate connected to said head, said main die plate having first and second communication openings in communication with said at least one passage formed in said head;

a fixed die plate connected to said main die plate on a side thereof opposite from said head, said fixed die plate including a movable die slidably disposed therein, said movable die having an extrusion opening formed therein shaped to form the molding, wherein said fixed die plate has first and second supply passages formed therein for interconnecting said first and second communication openings of said main die plate with said movable die, said movable die having first and second inlet passages formed on opposite sides of said movable die and arranged so as to communicate between said first and second supply passages, respectively, and said extrusion opening.

17. The apparatus according to claim 15, wherein said at least one passage in said head has a variable volume.

18. The apparatus according to claim 17, further including a cylinder communicating with said at least one passage, said cylinder having a piston slidably disposed therein, wherein a position of said piston in said cylinder determines a volume of space in said at least one passage.

19. The apparatus according to claim 18, wherein said piston is selectively movable by a first driving unit and wherein said movable die is selectively movable by a second driving unit.

20. The apparatus according to claim 19, wherein said first and second driving units are connected to and controlled by a controller unit.

21. The apparatus according to claim 15, wherein said second opening of said slidably movable die is constructed and arranged to form the second function portion so as to be hollow.

22. The apparatus according to claim 15, wherein the second function portion is hollow.

* * * * *